United States Patent

Park et al.

[11] Patent Number: 6,064,951
[45] Date of Patent: May 16, 2000

[54] QUERY TRANSFORMATION SYSTEM AND METHOD ENABLING RETRIEVAL OF MULTILINGUAL WEB DOCUMENTS

[75] Inventors: Dong-In Park; Tae-Wan Kim; Chul-Min Sim; Won Chang; Sung-Kwon Choi; Sang-Hwa Yuh; Young-Soog Chae, all of Daejeon; Young-Kil Kim, Seoul; Han-Min Jung, Daejeon, all of Rep. of Korea

[73] Assignee: Electronic and Telecommunications Research Institute, Daejeon, Rep. of Korea

[21] Appl. No.: 09/006,838

[22] Filed: Jan. 12, 1998

[30] Foreign Application Priority Data

Dec. 11, 1997 [KR] Rep. of Korea ............... 97-69081

[51] Int. Cl.[7] .................. G06F 17/28; G06F 17/30
[52] U.S. Cl. .................. 704/8; 704/3; 704/4; 704/7; 707/5; 707/536
[58] Field of Search ................. 704/2, 3, 4, 5, 704/6, 7, 8, 9, 10, 1; 707/1, 2, 3, 4, 5, 6, 7, 104, 530, 531, 536, 501, 513; 379/88.05, 88.06, 88.17

[56] References Cited

U.S. PATENT DOCUMENTS

| | | | |
|---|---|---|---|
| 5,467,448 | 11/1995 | Hilton et al. | 707/520 |
| 5,500,920 | 3/1996 | Kupiec | 704/270 |
| 5,596,744 | 1/1997 | Dao et al. | 707/10 |
| 5,600,831 | 2/1997 | Levy et al. | 707/2 |
| 5,721,897 | 2/1998 | Rubinstein | 707/2 |
| 5,724,593 | 3/1998 | Hargrave, III et al. | 704/7 |
| 5,740,231 | 4/1998 | Cohn et al. | 379/88.22 |
| 5,748,974 | 5/1998 | Johnson | 704/9 |
| 5,799,268 | 8/1998 | Boguraev | 704/9 |
| 5,852,798 | 12/1998 | Ikuta et al. | 704/2 |
| 5,884,246 | 3/1999 | Boucher et al. | 704/2 |
| 5,937,422 | 8/1999 | Nelson et al. | 707/531 |

FOREIGN PATENT DOCUMENTS

| | | |
|---|---|---|
| 404120662A | 4/1992 | Japan . |
| 410307829A | 11/1998 | Japan . |

*Primary Examiner*—Joseph Thomas
*Attorney, Agent, or Firm*—Browdy and Neimark

[57] ABSTRACT

A query transformation system and method capable of not only solving an ambiguousness of words involved in the transformation of queries from one language to another language, but also executing its processing independently of the processing of an information retrieval system used, so that it can be applied to a variety of information retrieval systems, thereby enabling the information retrieval system used to function as a multilingual information retrieval system. The system includes a translation generator for generating all possible translations of an input query consisting of a source language by reference to a translation dictionary, a semantic category verifier for receiving the generated translations from the translation generator, and eliminating translations having a low semantic similarity from the received translations, based on a semantic category tree, and a collocation information verifier for receiving the translations, which includes no translation having a low semantic similarity, from the semantic category verifier, and eliminating translations having no collocation from the received translations, based on word collocation information.

7 Claims, 5 Drawing Sheets

QUERY TRANSFORMATION SYSTEM AND METHOD ENABLING RETRIEVAL OF MULTILINGUAL WEB DOCUMENTS

BACKGROUND OF THE INVENTION

1. Field of the Invention

The present invention relates to a query transformation system for transforming a query consisting of a mother language into a corresponding one consisting of a foreign language, thereby enabling users, who use only the mother language, to use a retrieval system for information consisting of a foreign language. In particular, the present invention relates to a query transformation system and method capable of not only solving an ambiguousness of words involved in the transformation of queries from one language to another language, but also executing its processing independently of the processing of an information retrieval system used, so that it can be applied to a variety of information retrieval systems, thereby enabling the information retrieval system used to function as a multilingual information retrieval system.

2. Description of the Prior Art

Recent expansion and the spread of Internet results in a rapid increase in the number of web documents on the Internet. In this connection, a variety of web document retrieval systems have been proposed to provide services for retrieving web documents associated with queries of users. Most known web document retrieval systems are used for monolingual web documents. Retrieval systems for multilingual web documents such as Altavista and Yahoo have also been proposed.

Where a retrieval system only supporting monolingual documents is used, users should input queries consisting of the same language as the language used in the retrieval system. For this reason, users, who use a language other than the language used in the retrieval system, can not utilize such a retrieval system. On the other hand, retrieval systems supporting multilingual documents have a problem in that queries should be made up using the same language as those of documents to be retrieved.

For instance, where it is desired to retrieve foreign news for a report on "airplane crash accidents" using a conventional web document retrieval system such as the Altavista, an associated English query "airplane crash accident" should be input in the case in which the document to be retrieved is made up using English language. Where the document to be retrieved consists of Korean language, a corresponding Korean query should be input. That is, the query should be made up using a language corresponding to the document to be retrieved.

Recently, home page retrieval systems, such as the Shimani, adapted to retrieve Korean documents have been proposed which support an extension to English queries. Such systems use a method for transforming Korean words into corresponding English words by simply using a Korean-English translation dictionary.

For example, in the case of a Korean query 비행기 추락 사고 (airplane crash accident)", its words 비행기 (airplane)", 추락 (crash)" and "사고 (accident)" are transformed into corresponding English words by reference to a Korean-English translation dictionary. That is, English words "airplane", "aircraft" and "plane" are obtained for the Korean word 비행기 (airplane)" from the Korean-English translation dictionary. For the Korean word 추락 (crash)", English words "fall" and "crash" are obtained. For the Korean word 사고 (accident)", English word, "thought" and "accident" are obtained. However, this query transforming method simply using a translation dictionary has a problem in that the system performance, as related to retrieval accuracy, in retrieving English documents may be greatly degraded when the resultant English query includes an ambiguous word such as the word "thought" in the above-mentioned case.

SUMMARY OF THE INVENTION

Therefore, the present invention has been made in view of the above-mentioned problem, and an object of the invention is to provide a multilingual query transformation system and method capable of automatically transforming queries into the language supported by a known web information retrieval system used while eliminating an ambiguousness of words involved in the transformation of the queries, thereby generating a desired query usable as an input for the web information retrieval system.

In accordance with one aspect, the present invention provides a query transformation system enabling retrieval of multilingual web documents comprising: a query input unit for inputting a query consisting of a source language, the query input unit comprising a keyboard; an input query memory unit for storing the query, consisting of the source language, received from the query input unit; a transformation control unit for controlling the entire query transformation operation of the system; a translation generating/filtering unit for generating translations of the input query and filtering unnecessary ones of the generated translations; a translation knowledge unit stored with at least one electronic dictionary to be used for a transformation of queries and a variety of information; a transformed query memory unit for storing the query transformed from the source language into a target language; and a result output unit for outputting the result of the transformation in the form of the target language on a screen.

In accordance with another aspect, the present invention provides a query transformation method enabling retrieval of multilingual web documents, comprising the steps of: generating a transformation start signal when a tool button on a screen associated with the start of a transformation is clicked; starting a query transformation in response to the transformation start signal; generating all possible translations of an input query from a user by reference to a translation dictionary; determining whether or not translations are generated; if there is no translations generated, informing the user of the fact that there is no translation generated, while if there are translations generated, executing a comparison processing for the generated translations, based on a semantic category tree, thereby eliminating unnecessary ones of the translations; analyzing a collocation of the resultant translations by reference to a collocation information dictionary, thereby eliminating unnecessary ones of the analyzed translations; determining whether or not there are translations left; and if there are translations left, outputting the left translations as a transformed query on the screen, while if there is no translation left, recovering the generated translations, and outputting the recovered translations as a transformed query on the screen.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
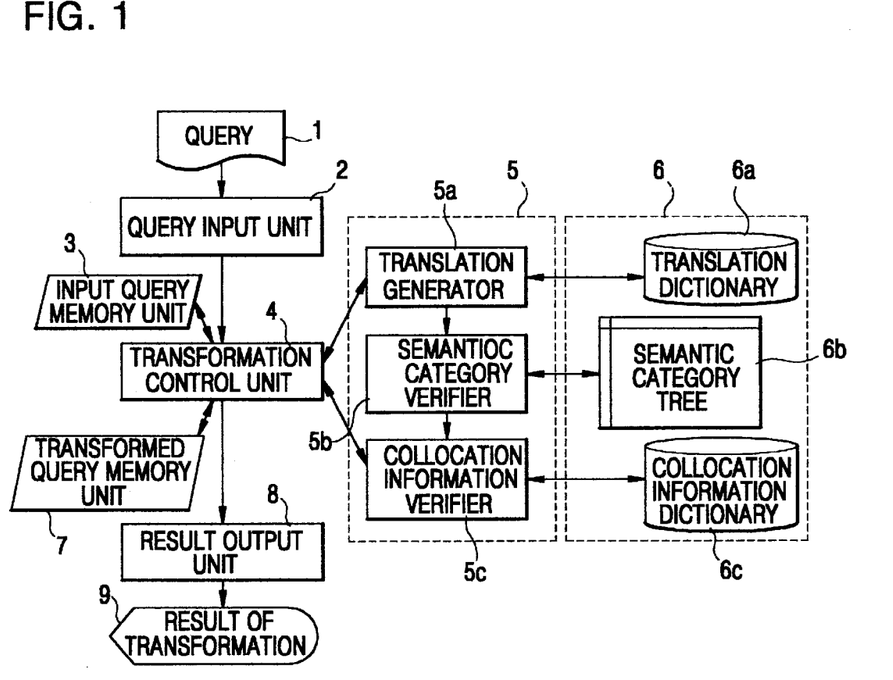
FIG. 1 is a block diagram illustrating the configuration of a mutilingual query transformation system according to an embodiment of the present invention.

FIG. 1 illustrates the configuration of a multilingual query transformation system according to an embodiment of the present invention. As shown in FIG. 1, the multilingual query transformation system includes a query input unit 2 for inputting a query 1 consisting of a source language, and an input query memory unit 3 for storing the query, consisting of the source language, received from the query input unit 2. The query input unit 2 comprises a keyboard. The multilingual query transformation system further includes a transformation control unit 4 for controlling the entire query transformation operation of the system, a translation generating/filtering unit 5 for generating translations of the input query and filtering unnecessary ones of the generated translations, a translation knowledge unit 6 stored with an electronic dictionary to be used for a transformation of queries and a variety of information, a transformed query memory unit 7 for storing the query transformed from the source language into a target language, and a result output unit 8 for outputting the result of the transformation in the form of the target language on a screen.

Where the multilingual query transformation system is used to transform Korean language into English language, the source language is Korean language whereas the target language is English language.

Figure 2:
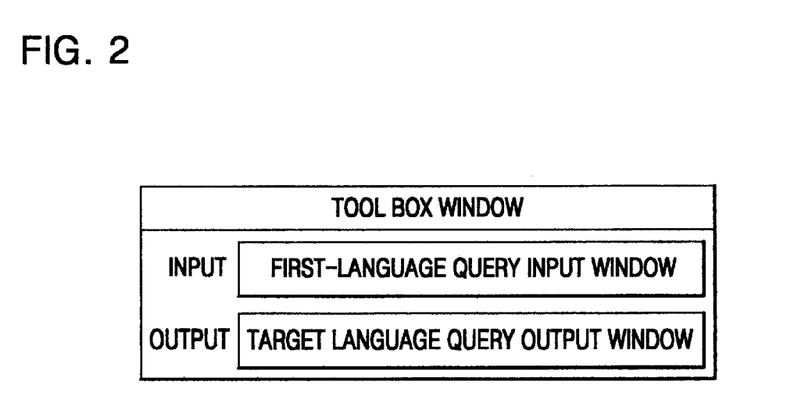
FIG. 2 is a schematic view illustrating an example of an arrangement of pictures on a screen included in the multilingual query transformation system of the present invention shown in FIG. 1.

FIG. 2 is a schematic view illustrating an example of an arrangement of pictures on the screen which are input and output by the query input unit 2 and result output unit 8, respectively. At the upper portion of the screen, there is a tool box window adapted to call a variety of extension functions such as a desired transformation language and a desired transformation mode. The screen is also defined at its middle portion with a source language query input window at which a query consisting of the source language can be input, and at its lower portion with a target language query output window at which a transformed query consisting of the target language is output.

When the transformation control unit 4 receives an input signal, namely, a source language query, from the query input unit 2, it sends the received source language query to the translation generating/filtering unit 5. The translation generating/filtering unit 5 includes a translation generator 5a, a semantic category verifier 5b, and a collocation information verifier 5c.

When the translation generating/filtering unit 5 receives an input signal, namely, the source language query, from the transformation control unit 4, it generates a target language query transformed from the source language query through its translation generator 5a, semantic category verifier 5b and collocation information verifier 5c. The transformed query is then stored in the transformed query memory unit 7 which, in turn, sends the stored query to the result output unit 8. Finally, the user copies the finally output target language query in a clip board copy manner, thereby allowing the query to be input at the web document retrieval system. Thus, it is possible to retrieve multilingual documents.

Figure 3:
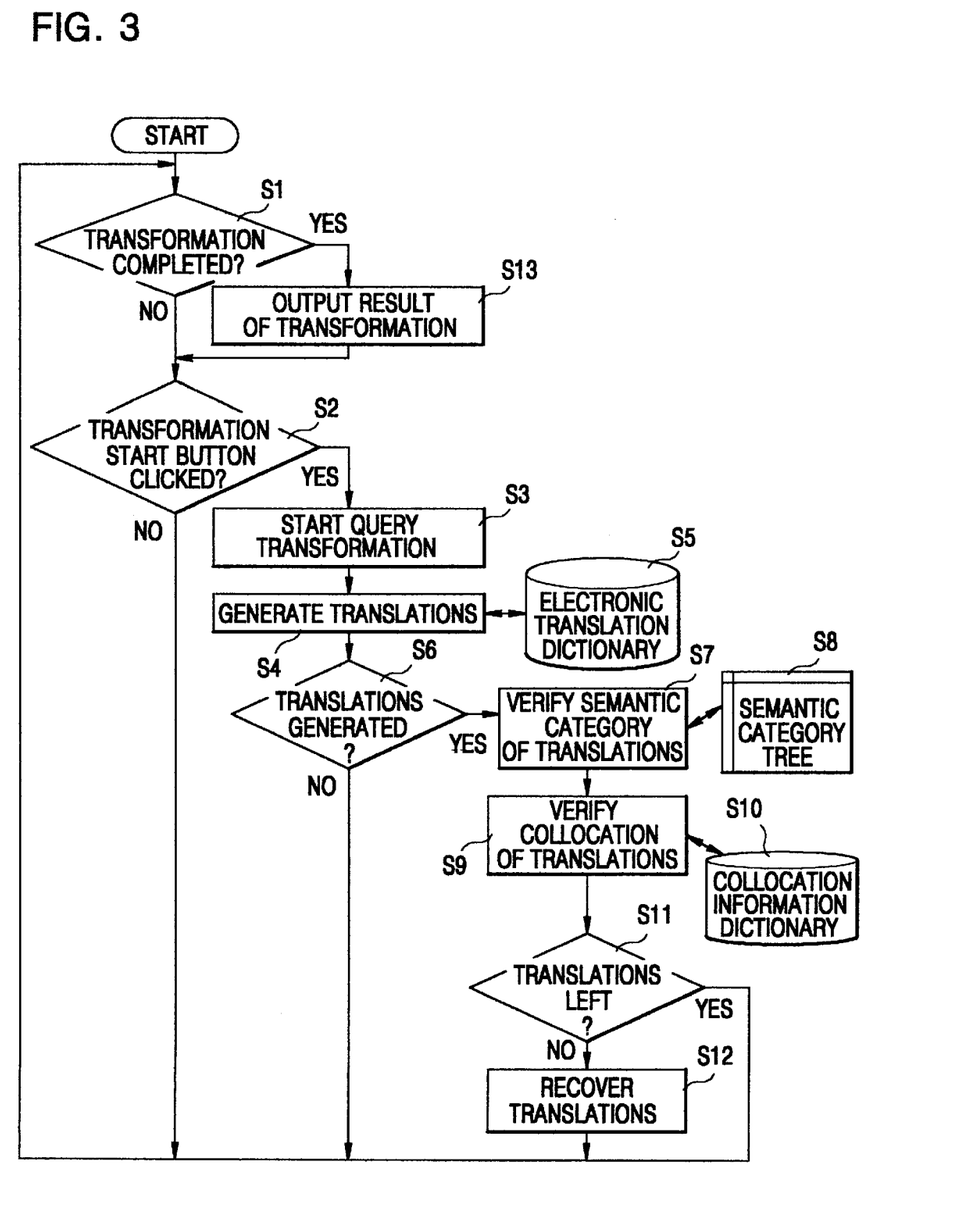
FIG. 3 is a flow chart illustrating a processing procedure for transforming a query into a desired language in the multilingual query transformation system of the present invention shown in FIG. 1.

FIG. 3 is a flow chart illustrating a processing procedure for transforming a query into a desired language in the multilingual query transformation system of the present invention shown in FIG. 1. For the simpleness of description, the following description will be made in conjunction with the case in which a Korean query is transformed into a corresponding English language. When a tool button on the screen of FIG. 2 associated with the start of a transformation is clicked, a transformation start signal is generated (Step S1 and S2). In response to the transformation start signal, the multilingual query transformation system starts a query transformation (Step S3). The query transformation is executed through several processing steps. At the first query transformation step, the translation generator 5a generates all possible translations of an input query by reference to the Korean-English translation dictionary 6a (Steps S4 and S5). When the translation generator 5a generates no translation of the input query, it informs the user of the fact that there is no translation (Step S6). When it is determined at step S6 that there are translations of the input query, the semantic category verifier 5b executes a comparison processing for the translations, based on a semantic category structure 6b stored therein, thereby eliminating unnecessary translations (Steps S7 and S8). Thereafter, the collocation verifier 5c analyzes a collocation relation of each pair of the translations output from the semantic category verifier 5b by reference to a collocation information dictionary 6c stored therein, thereby eliminating unnecessary translations (Steps S9 and S10). After the execution of the above-mentioned ambiguousness eliminating procedure including two steps, namely, steps S7 and S9, it is finally checked whether or not translations are left (Step S11). Where it is determined at step S11 that there is no translation, all the translations generated by the translation generator 5a are recovered in order to provide a minimum retrieval performance, because the translations generated by the translation generator 5a have been completely eliminated (Step S12). The recovered translations are then output as a transformation result 9. Where it is determined at Step S11 that there are translations, these translations are output as the transformation result 9.

The following Table 1 shows the processing results obtained from the translation generating/filtering unit of FIG. 1 for input queries That is, Table 1 shows the results obtained after transforming Korean queries 비행기 추락 사고 (airplane crash accident)" and 지구 대기 현상 (earth ambient phenomenon)" into English.

TABLE 1

| Query | Translation | Semantic Category Code |
|---|---|---|
| 비행기 | plane | CITCV |
| | airplane | CITCV |
| | aircraft | ACL |
| 추 락 | fall | ACL |
| | crash | ACC |
| 사 고 | accident | AAC |
| | thought | AAM |
| 지 구 | earth | CITV |
| | region | APS |
| 대 기 | latency | ATT, AS |
| | air | CITMS |
| | ambient | CITV |
| 현 상 | situation | AS, AL |
| | phenomenon | AS |
| | development | AA |

The translation dictionary 6a, to which the translation generator is referred, includes header words, translations of those header words, and sort codes for those translations. Translations generated by the translation generator 5a are verified in terms of a semantic similarity by the semantic category verifier 5b.

Figure 4:
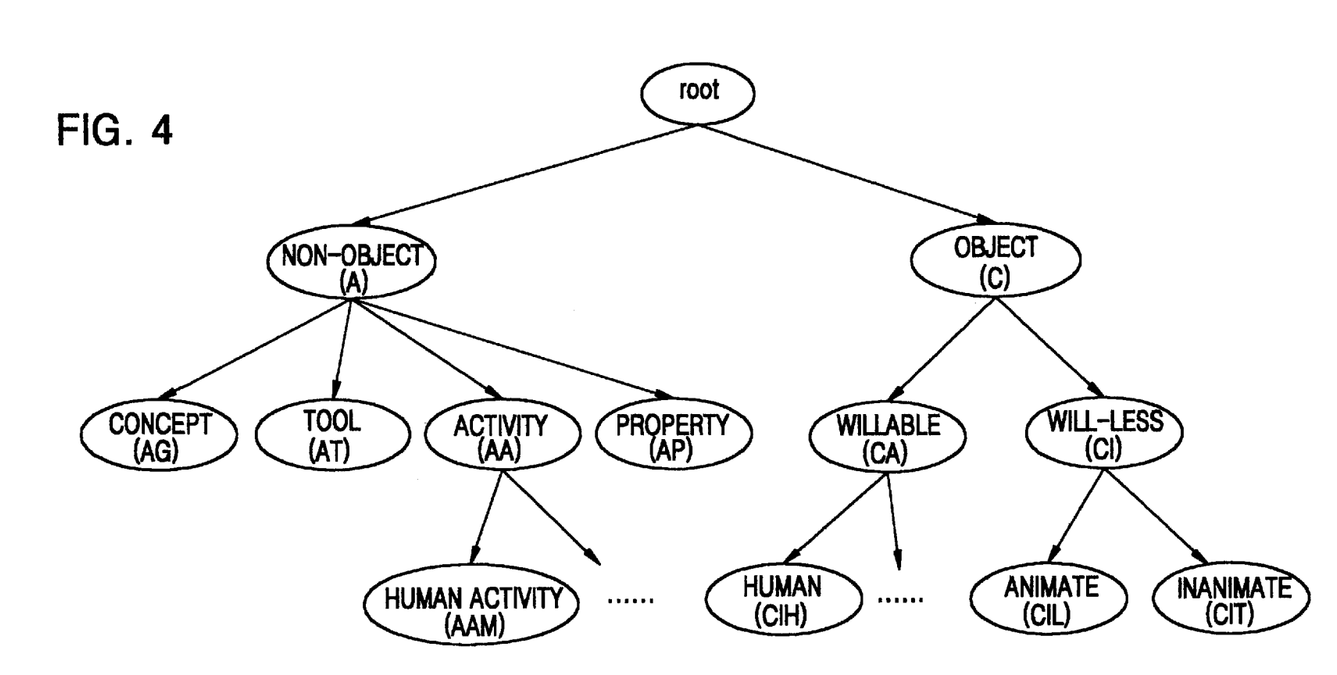
FIG. 4 is a diagram illustrating an example of a semantic category tree to which a semantic category verifier included in the multilingual query transformation system of the present invention shown in FIG. 1 is referred.

FIG. 4 is a diagram illustrating an example of a semantic category tree to which the semantic category verifier 5b is referred. The semantic category verifier 5b numerically calculates the semantic similarity between associated translations, using a semantic similarity verifying function based on a semantic category tree. The following expression is an example of the semantic similarity verifying function:

[Expression]
If match_count<2, then W(i,j)=0
Else $$W(i, j) = \frac{1}{2^{5-\text{match\_count}}}$$

The semantic category tree used in accordance with the present invention is) allocated for its nodes and leaves with intrinsic semantic category codes each having one to five digits in accordance with the layer depth. Each semantic category code is expressed in the form of one to five-digit Alphabet spellings. Each digit of a semantic category code is indicative of the name of an associated node in the semantic category tree of FIG. 4. The semantic category verifier 5b determines the semantic similarities of translations, based on the distance between the semantic category codes of associated translations. In other words, the semantic similarities of each translation to associated translations other than translations having the same header as the subject translation are added to the associated translations, respectively. For example, in the case of "earth" in FIG. 4, respective semantic similarities of this translation to all translations are calculated. The calculated semantic similarities are added to the node of the translation "earth" and the node of each translation associated with the translation "earth". In the above Expression, "match_count" represents the number of identical code elements between two associated translations. Where the value of "match_count" in the above Expression is less than 2, the semantic similarity "W(i,j)" between the i-th translation and the j-th translation is considered to be zero (0). This case corresponds to the case in which the codes of the associated translations are identical at only one digit thereof. In this case, accordingly, it is regarded that the associated translations have no semantic similarity. It is also regarded that two associated translations have an increased semantic similarity when those translations have an increased number of digits at which the codes of the translations are identical. Where two associated translations have at least 2 digits, at which the codes thereof are identical, the semantic similarity between those translations is determined, based on the Expression:

$$W(i, j) = \frac{1}{2^{5-\text{match\_count}}}$$

Figure 5:
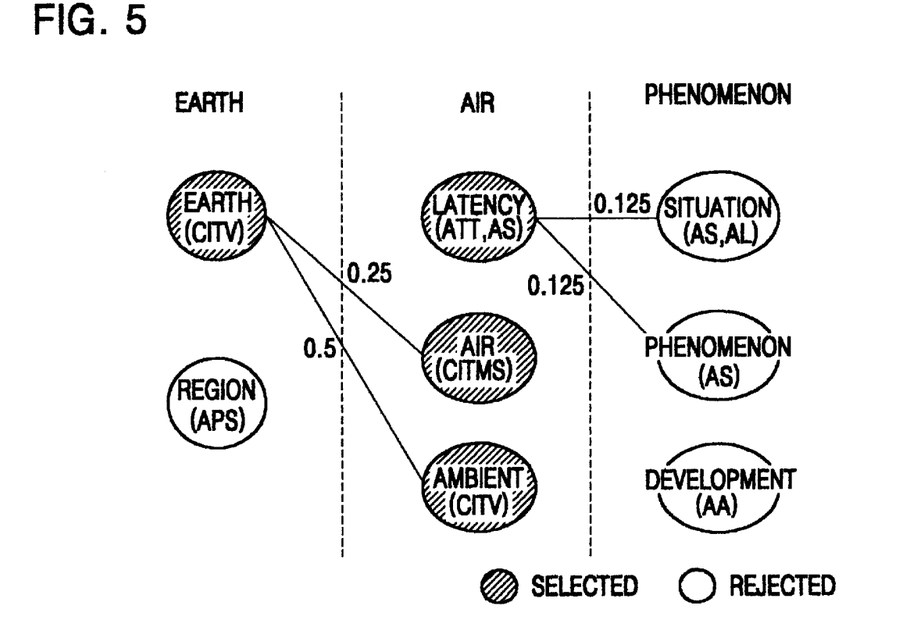
FIG. 5 is a schematic diagram illustrating the semantic similarity of translations, generated for a Korean query 지구 대기 현상 (earth ambient phenomenon)", output from the semantic category verifier shown in FIG. 1 in accordance with the present invention.

FIG. 5 is a schematic diagram illustrating the semantic similarity of translations, generated for a Korean query 지 구 대 기 현 상 (earth ambient phenomenon)" by the translation generator, output from the semantic category verifier. The semantic similarity of each pair of all translations is calculated using the semantic similarity calculating function. The calculated semantic similarity value is accumulatively stored in the nodes of the associated translated words, respectively. Ambiguous translations, which are wide apart from the semantic category range of generated translations, can be eliminated, based on the semantic category tree. In some cases, however, it is impossible to find out ambiguous translations only using the semantic category tree. For example, in the case of a Korean query 비행기 추 락 사 고 (airplane crash accident)", English translations "plane", "airplane" and "aircraft" of the Korean word 비행기 (airplane)" have the same semantic category code, namely, CITCV indicative of a ride. English translations "fall" and "crash" of the Korean word 추 락 (crash)" have the same semantic category code, namely, ACL indicative of a positional variation. On the other hand, English translations "accident" and "thought" of the Korean word 사 고 (accident)" have different semantic category codes, namely, AAC indicative of an event and AAM indicative of a mental activity, respectively. However, these translations "accident" and "thought" have the same semantic similarity to other translations. In such a case, accordingly, it is impossible to eliminate ambiguous translations, based on the semantic similarity. In order to solve this problem, collocation information is used in accordance with the present invention. Meanwhile, the three English translations of the Korean word 비행기 (airplane)" have a semantic similarity of "1" because their semantic category codes are identical at 5 digits. It is difficult to distinguish words in a word group having a semantic similarity of "1" from one another. Accordingly, where the collocation information is used, words in such a word group having a semantic similarity of "1" are regarded as a single word. In the case of FIG. 5, English translations having no semantic similarity, namely, "region" and "development", are eliminated from the final English translations obtained after executing the semantic category verification.

Figure 6:
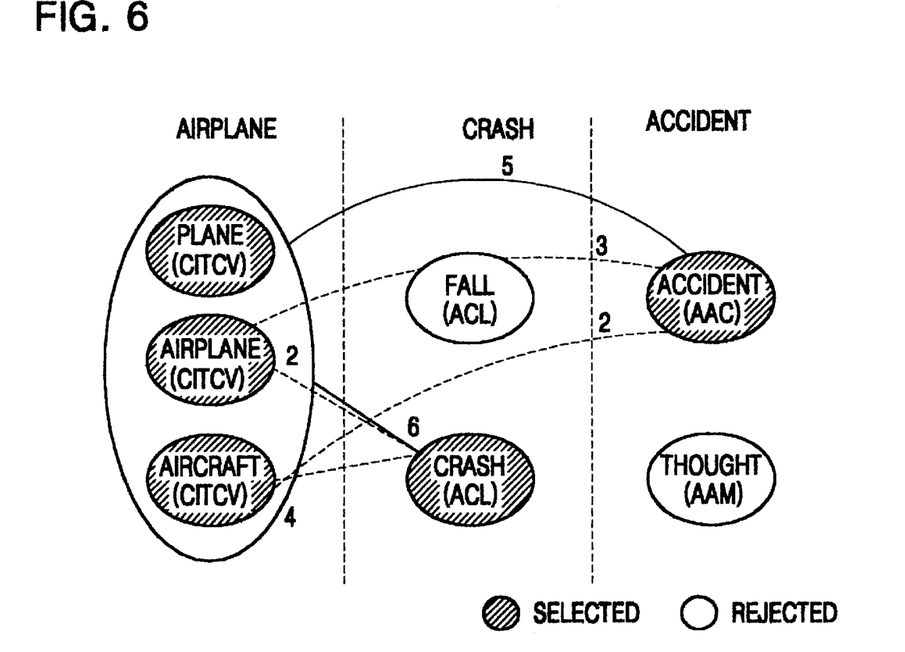
FIG. 6 is a schematic diagram illustrating an example of a collocation information verification which is executed in a collocation information verifier included in the multilingual query transformation system of the present invention shown in FIG. 1 for translations of a Korean query 비행기 추락 사고 (airplane crash accident)"
Figure 7:
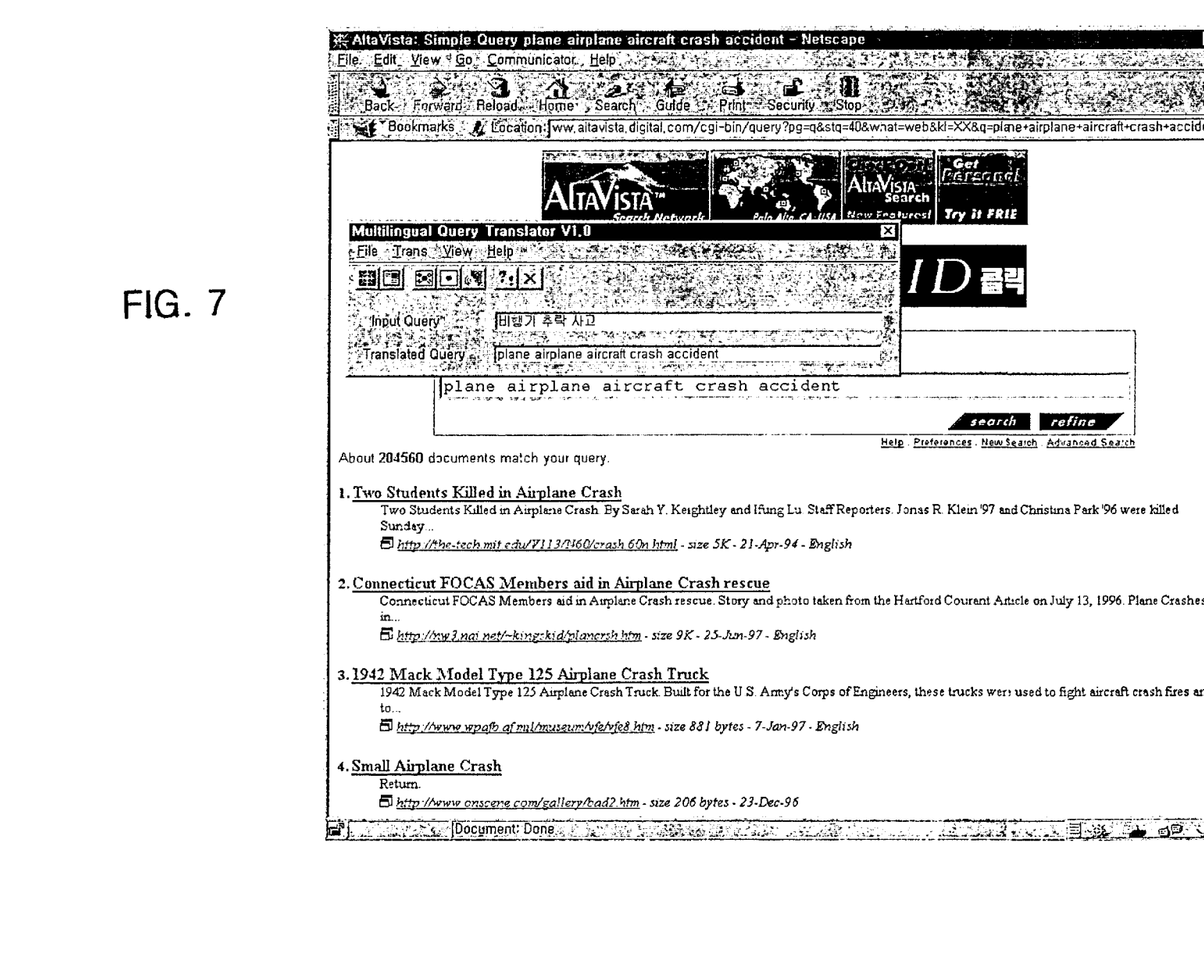
FIG. 7 is a picture illustrating a screen of the multilingual query transformation system of FIG. 1 operatively connected to the Altavista, which is a well-known web document retrieval system, in accordance with the present invention.

FIG. 6 is a schematic diagram illustrating an example of a collocation information verification which is executed using a collocation information dictionary 6c stored with collocation information extracted from a plurality of web documents, in order to solve an ambiguousness involved in translations of a Korean query 비행기 추 락 사 고 (airplane crash accident)".

The extraction of the collocation information is achieved as follows. First, a plurality of web documents are retrieved. The hypertext markup language (HTML) tags of the retrieved web documents, which constitute home pages, are then eliminated. Thereafter, the web documents are separated by sentences. From each sentence, index words are then extracted. In such a manner, a plurality of index words are collected. From these collected index words, those corresponding to header words, which generate ambiguous translations, are extracted. The header words are those previously collected. Thereafter, for each of the extracted index words, words used in the sentence, in which the index word is used, are sought out. Collocation information about the words commonly used with the index word is stored in the collocation information dictionary. The collocation information includes word pairs each consisting of two words having a collocation relation in one sentence, and the frequency of use of the word pair in sentences.

FIG. 6 illustrates an example of a transformation of a Korean query 비행기 추락 사고 (airplane crash accident)" using collocation information. Although the English translation "plane" has no collocation relation with other translations, it is included in a final English query because it has a semantic similarity of "1" to the English translations "airplane" and "aircraft". The value of each link indicated in FIG. 6 is indicative of the frequency of use of the linked words. Similarly to the semantic category verification, the collocation information verifier extracts from the collocation information dictionary the collocation frequencies of all pairs of translations generated for a query. Each collocation frequency extracted is accumulatively stored in the nodes of the associated words. In the case of FIG. 6, the translation "thought" having no collocation relation with other translations is eliminated from the final English translations.

As apparent from the above description, in accordance with the present invention, even users, who can use only one language, can utilize information retrieval systems for documents consisting of other languages. In this case, it is unnecessary to modify the information retrieval systems. It is only necessary to add a multilingual query transformation system according to the present invention. That is, when a query consisting of a source language is input at the multilingual query transformation system, the system automatically transforms the query into a corresponding query consisting of a target language and applies the transformed query to an information retrieval system for documents consisting of the target language. Since the multilingual query transformation system executes its processing before the processing of the information retrieval system, it is possible to obtain an effect that the information retrieval system, which is usable for only one language, can be used as a multilingual information retrieval system. Moreover, the multilingual query transformation system of the present invention achieves an enhanced accuracy of the query transformation because it uses an ambiguousness eliminating method using a semantic category tree and collocation information, thereby improving the accuracy of the information retrieval and the retrieval speed, as compared to the conventional query extension scheme using only a simple translation dictionary.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A query transformation system enabling retrieval of multilingual web documents comprising:
    a query input unit for imputing a query consisting of a source language, the query input unit comprising a keyboard;
    an input query memory unit for storing the query, consisting of the source language, received from the query input unit;
    a transformation control unit for controlling the entire query transformation operation of the system;
    a translation generating/filtering unit for generating translations of the input query and filtering unnecessary ones of the generated translations;
    a translation knowledge unit stored with at least one electronic dictionary to be used for a transformation of queries and a variety of information;
    a transformed query memory unit for storing the query transformed from the source language into a target language; and
    a result output unit for outputting the result of the transformation in the form of the target language on a screen;
    wherein the translation generating/filtering unit comprises:
        a translation generator for generating all possible translations of the source language input query by reference to a translation dictionary;
        a semantic category verifier for receiving the generated translations from the translation generator, a eliminating translations having a low semantic similarity from the received translations, based on a semantic category tree; and
        a collocation information verifier for receiving the translations, which includes no translation having a low semantic similarity, from the semantic category verifier, and eliminating translations having no collocation from the received translations, based on word collocation information.

2. The query transformation system in accordance with claim 1, wherein the translation knowledge unit comprises:
    a plurality of electronic translation dictionaries consulted when a word consisting of the source language is transformed into the target language;
    a semantic category tree to which the semantic category verifier is referred; and
    a collocation information dictionary to which the collocation information verifier is referred.

3. The query transformation system in accordance with claim 1, wherein the semantic category verifier checks a semantic similarity of each of the translations generated from the translation generator, using a special word dictionary.

4. The query transformation system in accordance with claim 1, wherein the source language is Korean language, and the target language is English language.

5. The query transformation system in accordance with claim 1, wherein the source language is English language, and the target language is Korean language.

6. The query transformation system in accordance with claim 1, wherein the source language is Korean language, and the target language is a language other than Korean and English languages.

7. A query transformation method enabling retrieval of multilingual web documents, comprising the step of:

generating a transformation start signal when a tool button on a screen associated with the start of a transformation is clicked;

starting a query transformation in response to the transformation start signal;

generating all possible translations of an input query from a user by reference to a translation dictionary;

determining whether or not translations are generated;

if there is no translation generated, informing the user of the fact that there is no translation generated, while if there are translations generated, executing a comparison processing for the generated translations, based on a semantic category tree, eliminating translations having a low semantic similarity, thereby eliminating unnecessary ones of the translations;

analyzing a collocation of the resultant translations by reference to a collocation information dictionary, thereby eliminating unnecessary ones of the analyzed translations;

determining whether or not there are translations left; and if there are translations left, outputting the translations left as a transformed query on the screen, while if there is no translation left, recovering the generated translations, and outputting the recovered translations as a transformed query on the screen.

\* \* \* \* \*